(12) United States Patent
Goffin, II

(10) Patent No.: US 6,918,135 B1
(45) Date of Patent: Jul. 12, 2005

(54) SESSION ORIENTED SETTOP COMMUNICATION USING DYNAMIC, SYNCHRONIZED ROUTING

(75) Inventor: Glen Peter Goffin, II, Fountainville, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/265,774

(22) Filed: Mar. 10, 1999

(51) Int. Cl.$^7$ .......................... H04N 7/025; H04N 7/10; H04N 7/173
(52) U.S. Cl. .......................................... 725/116; 725/34
(58) Field of Search .............................. 725/32–36, 91, 725/93, 94, 114, 116, 117, 131; 348/180, 192, 461, 465, 473, 474, 705

(56) References Cited

U.S. PATENT DOCUMENTS

| 5,734,833 A | | 3/1998 | Chiu et al. ............. 395/200.55 |
| 5,999,970 A | * | 12/1999 | Krisbergh et al. .......... 725/109 |
| 6,124,878 A | * | 9/2000 | Adams et al. .............. 725/118 |
| 6,201,538 B1 | * | 3/2001 | Wugofski ................... 345/716 |
| 6,304,578 B1 | * | 10/2001 | Fluss .......................... 370/413 |
| 6,484,318 B1 | * | 11/2002 | Shioda et al. ............... 725/110 |
| 6,574,797 B1 | * | 6/2003 | Naegeli et al. ............. 725/120 |

FOREIGN PATENT DOCUMENTS

| WO | 9414279 | 6/1994 | ............ H04N/7/16 |
| WO | 9641478 | 12/1996 | .......... H04N/7/173 |
| WO | 9716925 | 5/1997 | .......... H04N/7/173 |

* cited by examiner

Primary Examiner—Chris Grant
Assistant Examiner—Hunter Lonsberry
(74) Attorney, Agent, or Firm—Volpe and Koenig, P.C.

(57) ABSTRACT

A system which provides session oriented communications between a settop terminal and a headend of a CATV communication system assigns downstream and upstream communication paths to the communication. A data router monitors the downstream communication path and re-routes the downstream communication path when a channel change is requested by a subscriber. The settop terminal notifies the data router that a channel change has been requested by the subscriber. The router re-routes the downstream portion of the data communication to the new channel requested by the subscriber, thereby insuring an uninterrupted data communication session.

7 Claims, 8 Drawing Sheets

290

| Subscriber | Downstream Channel | Upstream Channel |
|---|---|---|
| . | . | . |
| . | . | . |
| . | . | . |
| 126 | 32 | A |
| 127 | 50 | D |
| 128 | 06 | Q |
| 129 | 50 | J |
| 130 | 03 | B |
| . | . | . |
| . | . | . |
| . | . | . |

SESSION ORIENTED SETTOP COMMUNICATION USING DYNAMIC, SYNCHRONIZED ROUTING

BACKGROUND OF THE INVENTION

1. Field of the Invention

This invention relates to cable television (CATV) networks and services. More particularly, the invention relates to an in-band traffic routing system for a CATV communication system.

2. Description of the Related Art

CATV network operators have begun to offer their subscribers an increasingly diverse array of services from which to choose. In addition to the more "traditional" services that are offered, such as broadcast and premium video entertainment services, settop terminals are capable of handling interactive data and services.

The CATV transmission spectrum 21, as shown in FIG. 1, typically extends up to one gigahertz (1 GHz). In order to provide a bidirectional communication flow over the cable transmission network between the headend and the settop terminals, the transmission spectrum 21 is divided into upstream and downstream bandwidths 26, 28. The upstream bandwidth 26 is utilized to send communications from a settop terminal to the headend. The downstream bandwidth 28 is for communications from the headend to the settop terminals. The upstream bandwidth 26 includes frequencies from five to fifty megahertz, and typically includes a plurality of upstream communication channels 37. The downstream bandwidth 28 includes frequencies above fifty megahertz, and is further divided into a plurality of "in-band" channels 32, each having a bandwidth of 6 MHZ. The in-band channels 32 are primarily used for transmission of analog or digital video broadcasts and their associated analog or digital audio programs. Data channels 33, which typically have a much smaller bandwidth than in-band channels 32, are interspersed throughout the upstream bandwidth 26 and are used to transmit all other downstream communications. A separate control data channel (CDC) 34 is provided as a fixed data channel for facilitating administrative functions.

When an interactive communication is desired by the user of a settop terminal, the downstream communication path is established on one of the downstream data channels 33, 34. The upstream communication path is established on one of the upstream communication channels 37 or via the local telecommunication (telco) network. The drawback with this type of arrangement is that a settop terminal must have two separate receivers: 1) a tuner for receiving the in-band channels 32; and 2) an out-of-band data receiver for receiving the data channels 33, 34. This increases the cost and complexity of the settop terminal.

One alternative for eliminating the need for a separate data receiver is to send the data within the in-band channels 32. However, a significant problem in establishing communications between a headend and a settop terminal in this manner is that the downstream communication path is almost randomly dynamic. Since the downstream communication path is dependent upon the in-band channel 32 that a subscriber selects, it is impossible to predict when a change to a different in-band channel 32 will be made, or to which in-band channel 32 the tuner will be tuned. If a communication session using an in-band channel 32 is initially established, the subscriber must not change in-band channels 32 during the duration of the session or the downstream communication path will be lost, thereby interrupting the session. This is unacceptable for data-critical applications.

An alternative for eliminating the data receiver is to replicate the out-of-band data stream on each in-band channel 32. In this manner, the out-of-band data stream is available for every in-band channel 32 that the subscriber chooses. However, this approach is inherently wasteful of the bandwidth if the data is only required for a single settop terminal, such as for an interactive communication.

Accordingly, there exists a need for a system which conservatively utilizes the available communication bandwidth and does not require two separate receivers.

SUMMARY OF THE INVENTION

The present invention is a system which provides realtime session oriented communications between a settop terminal and a headend. The system in it initially assigns both downstream and upstream communication paths. The system monitors the downstream communication path associated with the session and re-routes the downstream communication path when a channel change is requested by a subscriber. The settop terminal notifies a data router within the headend that a channel change has been requested by the subscriber. The data router re-routes the downstream communication path from the current in-band channel to the next in-band channel, thereby insuring an uninterrupted communication session. In this manner the data can "follow" the settop terminal as the subscriber changes in-band channels. Accordingly, it becomes unnecessary to replicate the data on more than one in-band channel.

Accordingly, it is an object of the present invention to provide a system which efficiently utilizes the transmission spectrum of a CATV communication system by providing data communications within in-band channels.

Other objects and advantages of the present invention will become apparent after reading the description of a presently preferred embodiment.

BRIEF DESCRIPTION OF THE DRAWINGS

FIG. 6 is a look-up table implemented in memory.

DETAILED DESCRIPTION OF THE PREFERRED EMBODIMENT

Figure 1:
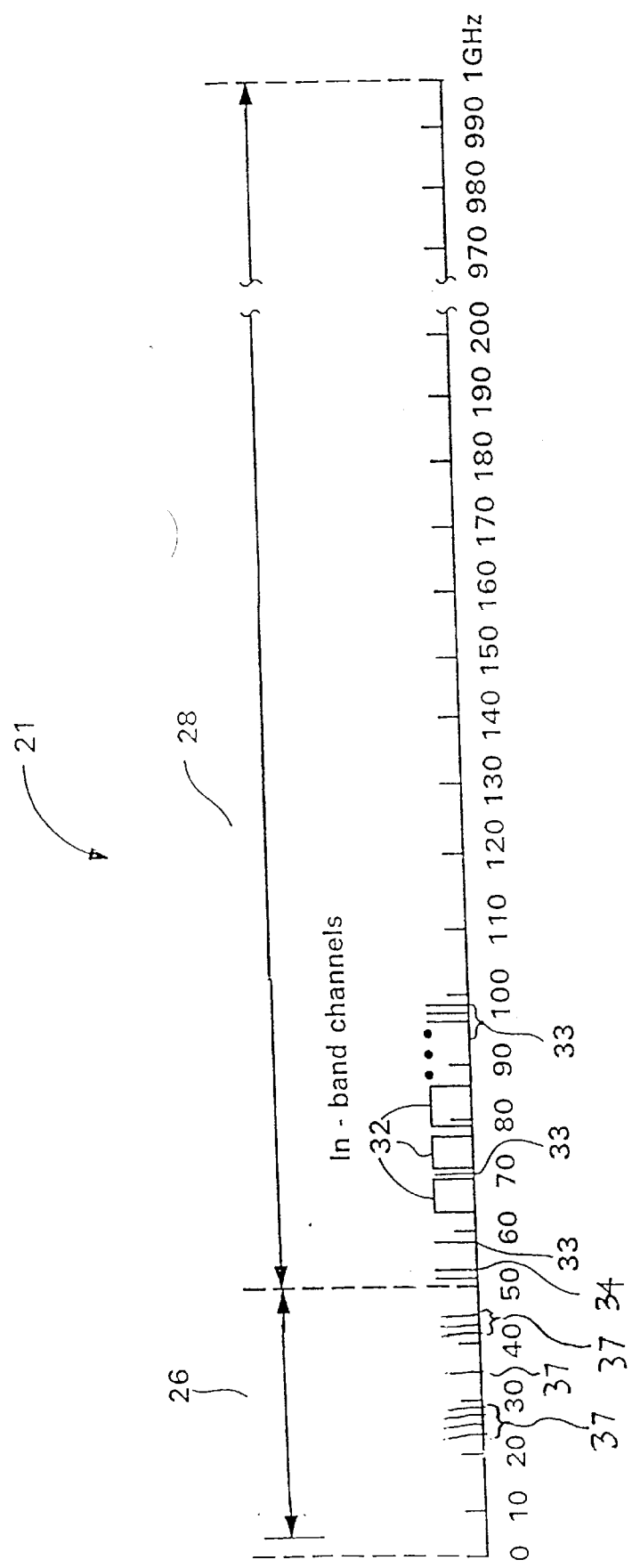
FIG. 1 is the transmission spectrum utilized by a CATV communication system.

The preferred embodiment is described with reference to the drawing figures where like numerals represent like elements throughout.

Figure 2:
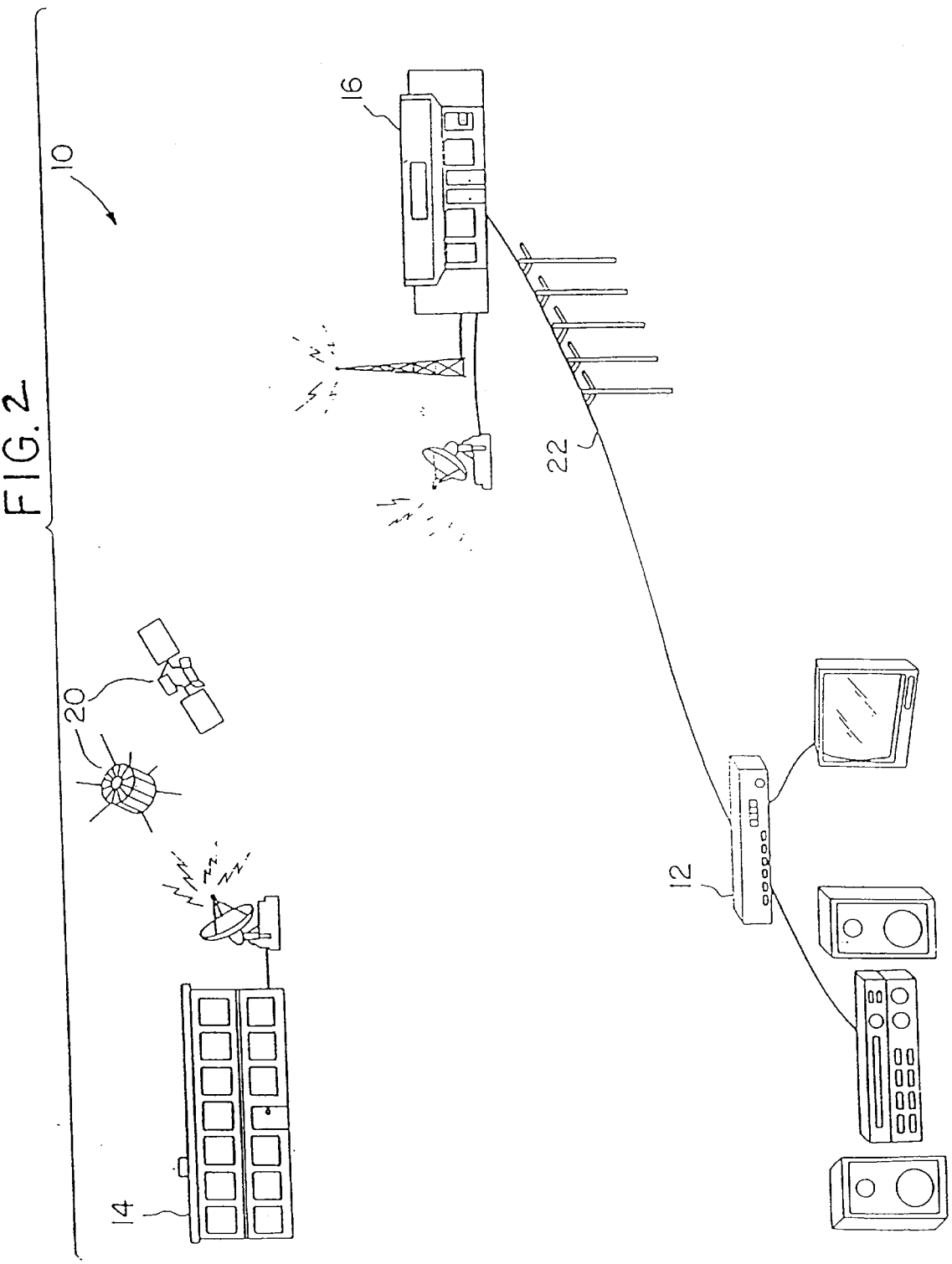
FIG. 2 is a simplified view of a CATV communication system.

A CATV communication network 10 embodying the present invention is shown in FIG. 2. The communication network 10 generally comprises one or more uplinks 14 which communicate with a plurality of headends 16, each of which in turn communicates with a plurality of settop terminals 12. The settop terminals 12 receive transmissions from the headend 16 through the CATV network 22. The network 22 may comprise a standard coaxial network, a hybrid fiber-coax network or a "wireless cable" network comprising microwave antennas and receivers. The settop terminals 12 are the user interface between a subscriber, the subscriber's receiving and transmitting equipment, (such as a television, a stereo system, a PC or other devices), and the communication network 10.

The uplink 14 is located remotely from headends 16 and communicates with the headends 16 via a satellite link 20. The uplink 14 generally receives video, audio and data content from remote content providers 70, (shown in FIG. 3), and forwards the content to the headends 16. This content may originate in digital or analog form and may include live or archival programs or interactive services, (for example movies, electronic encyclopedias, electronic catalogs and downloadable applications) The content is transmitted to the uplink 14 from a plurality of separate remote content providers 70 and is combined at the uplink 14 before being forwarded to the headends 16. Alternatively, a plurality of uplinks 14 may independently provide the content to each headend 16 which will receive and coordinate the transmissions from the uplinks 14.

The content from separate uplinks 14 and direct transmissions from remote content providers 70 are received and multiplexed together at the headend 16 and forwarded to the settop terminal 12 via a plurality of in-band channels 32. The programs on a given in-band channel 32 may comprise analog video and audio, digital video and audio, digital data or any combination or multiplex thereof. Thus, ten separate programs or more may be multiplexed within a single in-band channel 32. When a subscriber selects a program for viewing and/or listening, the settop terminal 12 will tune to the corresponding in-band channel 32 and will access the desired program from among the plurality of programs within the multiplex on that in-band channel 32.

Figure 3:
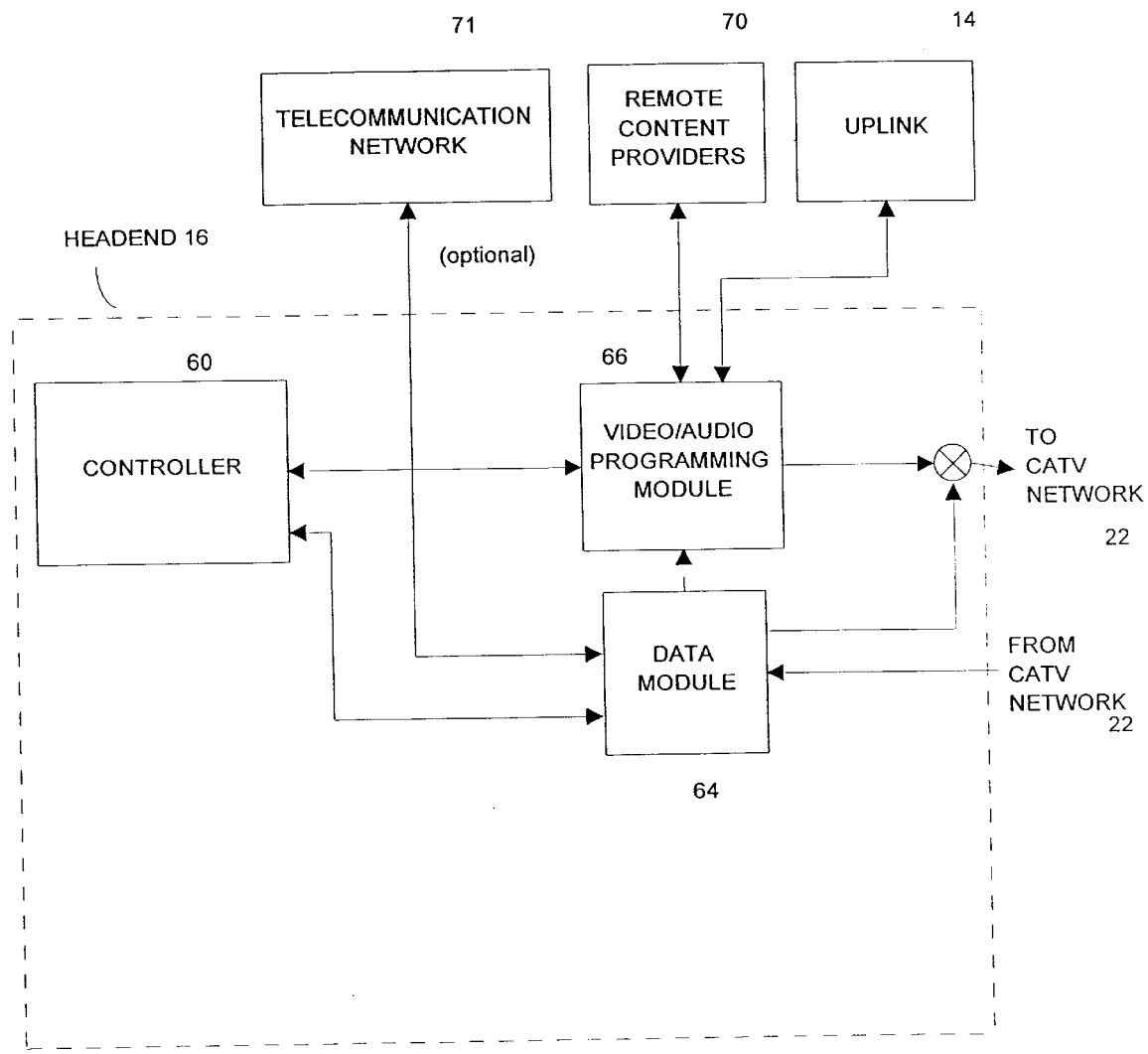
FIG. 3 is a block diagram of a headend made in accordance with the present invention.

Referring to FIG. 3, a headend 16 made in accordance with the teachings of the present invention is shown. The headend 16 receives the content from remote content providers 70 directly, or via an uplink 14, and retransmits this information over the CATV transmission network 22 in a manner that is well known to those skilled in the art. The headend 16 may also be the origination source of local programing content. Optionally, the headend 16 may be coupled with a local telecommunication (telco) network 71.

The headend 16 includes a controller 60 which controls all internal functions of the headend 16 including the reception and transmission of video, audio and data content to and from the remote content providers 70 and the settop terminals 12. The headend 16 also includes a video/audio programming module 66 and a data module 64. The video/audio programming module 66 facilitates transmission and reception of video and audio content between the remote content providers 70 and the settop terminals 12 as is well understood by those of skill in the art. The data module 64 facilitates data communications between the headend 16 and settop terminals 12; whether those communications originate via one of the settop terminals 12 or by an entity located outside of the CATV communication network 10. The manner in which these data communications are processed by the data module 64 will be described in greater detail hereinafter.

Figure 4:
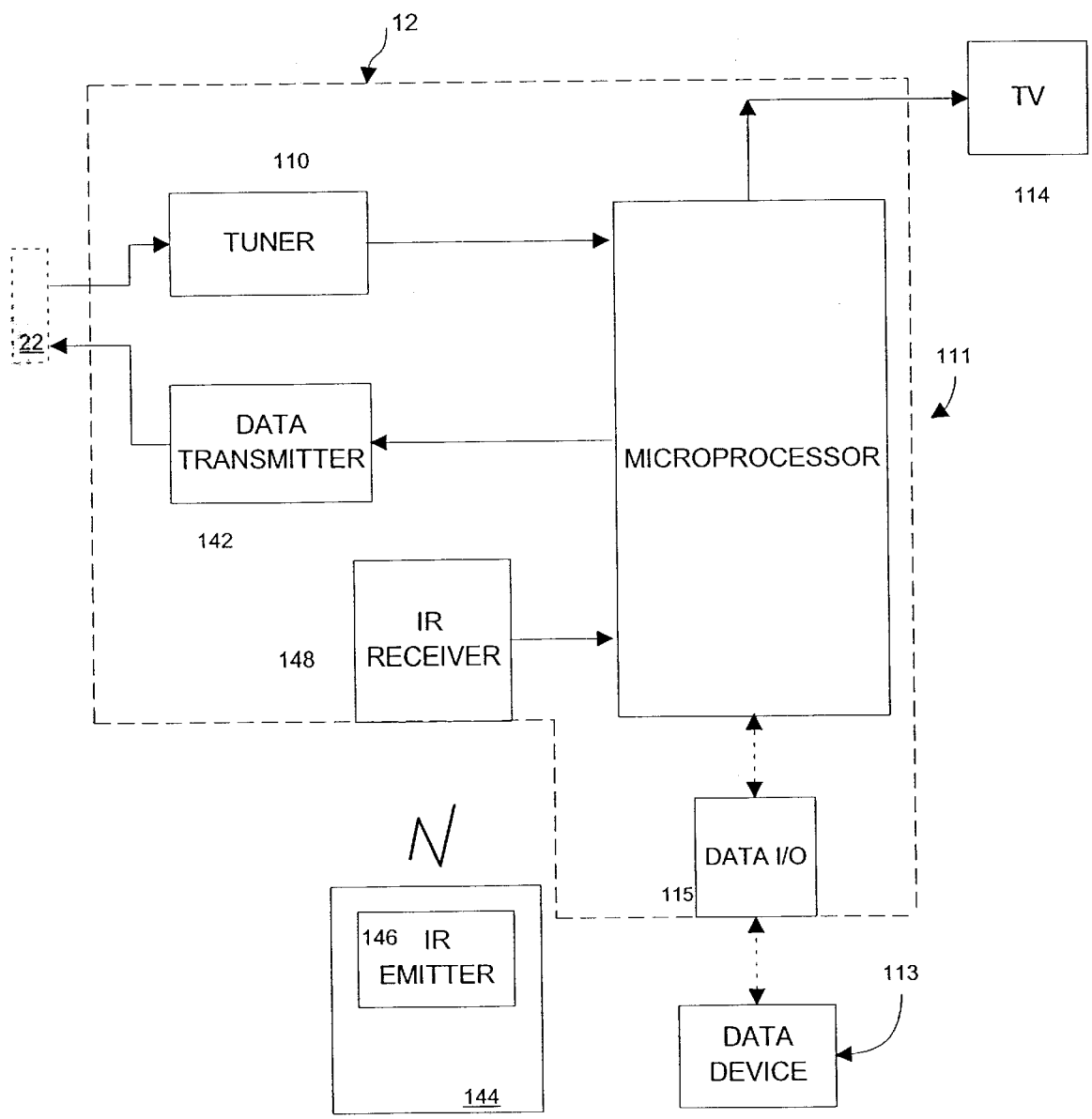
FIG. 4 is a block diagram of a settop terminal made in accordance with the present invention.

Referring to FIG. 4, a block diagram of a settop terminal 12 made in accordance with the present invention is shown. The settop terminal 12 includes a frequency agile tuner 110, a data transmitter 142, a microprocessor 111, (including an associated memory, not shown), and an IR receiver 148. The tuner 110 receives all video, audio and data communications from the headend 16. The data transmitter 142 transmits data from the settop terminal 12 to the headend 16.

The microprocessor 111 controls all internal functions of the settop terminal 12, including the processing of video and audio content for output to a subscriber's television 114, in a manner that is well understood by those of skill in the art. The microprocessor 111 facilitates the reception of data from the headend 16 via the tuner 110 and the transmission of data to the headend 16 via the data transmitter 142. The microprocessor 111 also facilitates communication with an external data device 113, such as a keyboard, a PC, or a joystick, via a data input/output (I/O) port 115.

The settop terminal 12 receives channel change and volume control instructions from the subscriber via a remote control 144. The remote control 144 includes an infrared (IR) signal emitter 146 which sends IR control signals to the IR receiver 148. The settop terminal 12 may also receive control instructions from an external data device 113 via the external data input/output (I/O) 115 or a front panel keyboard (not shown).

Video, audio and data content from the headend 16 is transmitted across the CATV network 22 and is processed through the tuner 110 and the microprocessor 111. The tuner 110 is responsive to tune to the frequency of the in-band channel 32 selected by the subscriber. It should be noted that since the content transmitted on an in-band channel 32 may comprise a multiplex of separate video, audio or data programs, the microprocessor 111 must translate the "channel" selection input by the subscriber into the correct in-band channel 32 and the correct program within the multiplex. The microprocessor 111 accesses the program from the multiplex and descrambles the selected baseband signal. Digital video and audio is decrypted, decoded and D/A converted. The baseband video and audio signal is placed on a second carrier signal frequency, typically television channel 3 or 4, for output to the television 114. Data content is forwarded by the microprocessor 111 to the proper destination. For example, the data content may comprise electronic programming guide (EPG) information which will be stored within the settop terminal 12 until the EPG is utilized by the subscriber. The data content may alternatively be forwarded through the data I/O 115 to the subscriber's PC 113.

Figure 5:
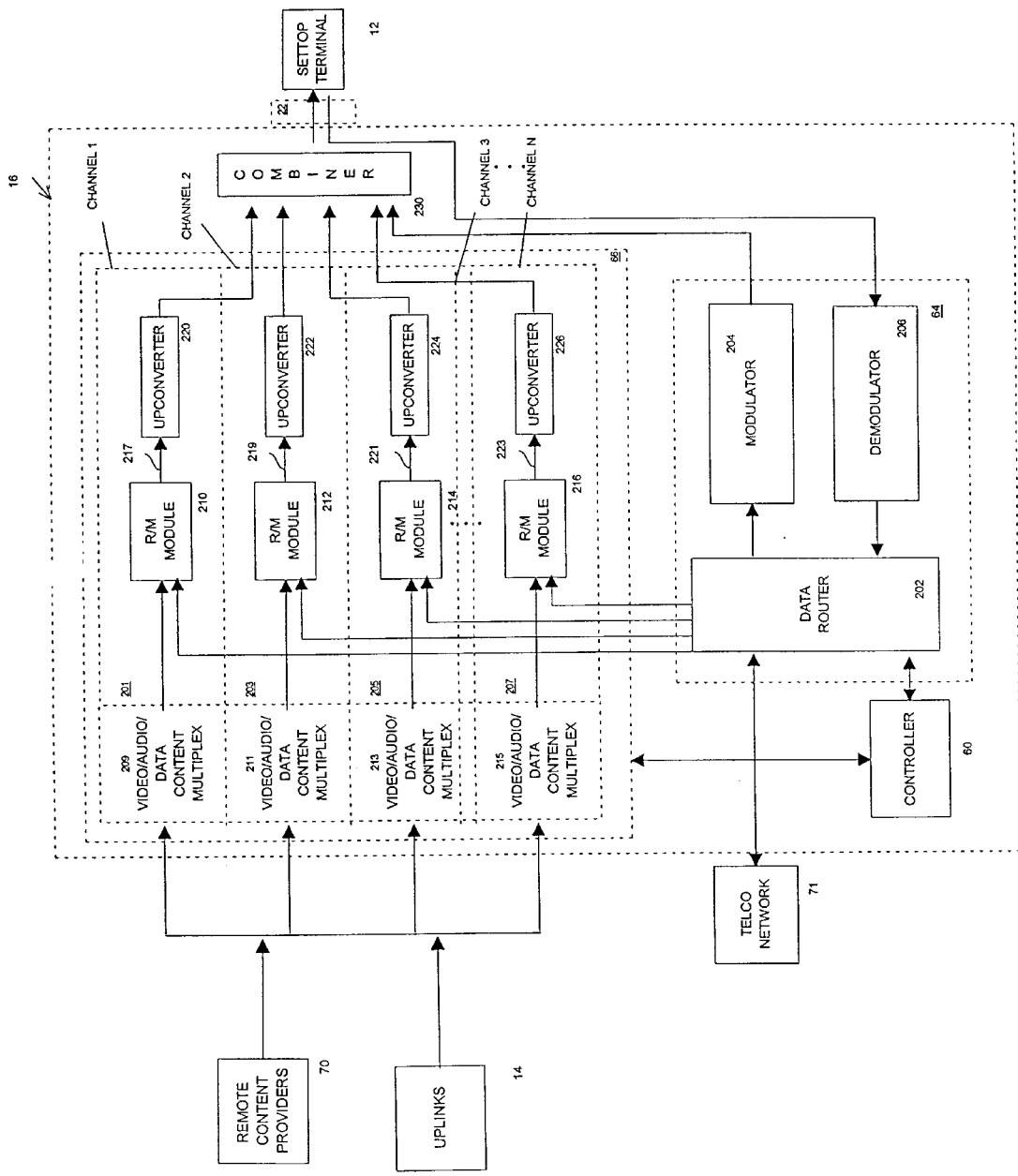
FIG. 5 is a more detailed block diagram of a headend including the data module in accordance with the present invention.

Referring to FIG. 5, a detailed block diagram of a headend 16 including a data module 64 is shown. The data module 64 includes a data router 202, a modulator 204 (optional) and a demodulator 206. The data router 202 is coupled to the controller 60, the telco network 71, and the video/audio programming module 66. The video/audio programming module 66 includes a processing means 201–207 for each in-band channel 32, (shown in FIG. 5 as Channel 1 . . . Channel N). Each processing means 201, 203, 205, 207 comprises a receiver/multiplexer (R/M) module 210, 212, 214, 216, and an up-converter 220–226. All of the up-converters 220, 222, 224, 226 are coupled to a combiner 230.

The video, audio and data content from the uplinks 14 and content providers 70 is forwarded to the video/audio programming module 66. The programming module 66 creates a plurality of content multiplexes 209, 211, 213, 215; one for each in-band channel 32. Each content multiplex 209, 211, 213, 215 is forwarded to a respective R/M module 210, 212, 214, 216. Each R/M module 210, 212, 214, 216 further multiplexes any data forwarded from the data router 202 with the respective content multiplex 209, 211, 213, 215 to create an baseband multiplex 217, 219, 221, 223. Each baseband multiplex 217, 219, 221, 223 is then forwarded to the corresponding up-converter 220, 222, 224, 226 which places the baseband multiplexes on the proper carrier signals within the transmission spectrum 21 for transmission. The combiner 230 combines the signals from all of the up-converters 220, 222, 224, 226 for transmission through the CATV plant 22 to the settop terminals 12. If a data-only transmission is desired, it may be forwarded by the data router 202 through the modulator 204 on a data channel 33 (as shown in FIG. 1). The data channel 33 is then sent to the combiner 230 for combining with all other channels. Use of the data channel 33 would necessitate the use of a data receiver at the settop terminals 12 to receive the data.

The upstream path is from the settop terminals 12, through the CATV plant 22, into the headend 16 terminating at the demodulator 206. For upstream communications, the microprocessor 111 within the settop terminal 12 forwards the baseband communication to the data transmitter 142 which upconverts the communication for transmission on one of the upstream data channels 37. The data transmitter 142 may share an upstream channel 37 with a plurality of other settop terminals 12. Alternatively, the data transmitter 142 may be frequency agile and may search for the next available upstream channel 37 or request the next available upstream channel 37 from the data router 202 within the headend 16. Any one of a plurality of known methods may be used to transmit this information upstream since the particular method of transmission of signals from the settop terminal 12 to the headend 16 is not central to the present invention. Preferably, the upstream communication will include a header which identifies the settop terminal 12 from which the upstream communication emanated.

The data router 202 stores information pertinent to each settop terminal 12; such as the address of each settop terminal 12 the in-band channel 32 to which each settop terminal 12 is tuned, and the upstream channel 37 requested by the settop terminal 12. This information may be periodically transmitted to the data router 202 by each settop terminal 12, or may only be transmitted upon initial settop terminal 12 energization and upon a channel change. As shown in FIG. 6, this may be stored in memory 290 within the data router 202 or the controller 60 as a look-up table 291. For example, the look-up table 291 indicates that subscriber number 129 is currently tuned to channel 50. Accordingly, data intended for subscriber number 129 is forwarded by the data router 202 to the R/M module 210, 212, 214, 216 that corresponds to in-band channel 50 and will transmit on upstream channel J. The data is multiplexed with the content multiplex for that channel to form the baseband multiplex 217–223 for transmission to the settop terminal 12. Data is received from subscriber number 129 on upstream channel J.

Referring back to FIG. 5, the return path demodulator 206 receives signals sent from the settop terminals 12 and demodulates the signals. The demodulated signals are forwarded to the data router 202, which reads the signals' destination address, comprising a settop terminal address, URL web address or any other form of electronic address, and determines where the signal must be routed. For example, the data router 202 may broadcast the signal to all settop terminals 12, forward the signal to a particular settop terminal 12, or transmit the signal to an external entity, such as a website, via the telco network 71. Signals forwarded to a particular settop terminal 12 are routed to the R/M module 210, 212, 214, 216 which generates the in-band channel 32 to which the particular settop terminal 12 is tuned. The settop terminal 12 receives the data over that in-band channel 32. Alternatively, the data router 202 may forward a communication to a settop terminal 12 via the optional modulator 204.

In order for the communication session to continue to completion without interruption, the data router 202 must always know the in-band channel 32 to which the settop terminal 12 is tuned. Accordingly, the settop terminal 12 forwards a "channel change notification" to the data router 202 when a subscriber desires to tune the settop terminal 12 to a new in-band channel 32. This channel change notification comprises the address of the settop terminal 12, (or a similar identification number), and the new channel number. The new channel number is derived from the preceding or subsequent channel when the down (▼) or up (▲) channel keys on the remote control 144, respectively, are depressed; or it is derived from the channel number input directly by the subscriber. The data router 202 detects the channel change notification, updates the look-up table 291 and routes all subsequent data for that settop terminal 12 to the R/M 210, 212, 214, 216 corresponding to the new in-band channel 32. Additionally, if there is a conflict resulting from two subscribers that attempt to use the same upstream communication channel 37, the data router 202 detects the conflict and notifies one or both of the subscribers to relocate to a different channel.

In an alternative embodiment, the settop terminal 12 will not change from the current in-band channel 32 to a new in-band channel 32 until all of the data on the current in-band channel 32 has been safely delivered to the settop terminal 12 and the data router 202 has forwarded a "channel change confirmation" message to the settop terminal 12. Data transmissions will be temporarily halted or stored in memory 290 until the settop terminal 12 receives the channel change confirmation message and confirms that it has tuned to the new in-band channel 32. This confirmation is communicated to the data router 202 via a "new channel confirmation" message transmitted from the settop terminal 12 to the data router 202.

Figure 7A:
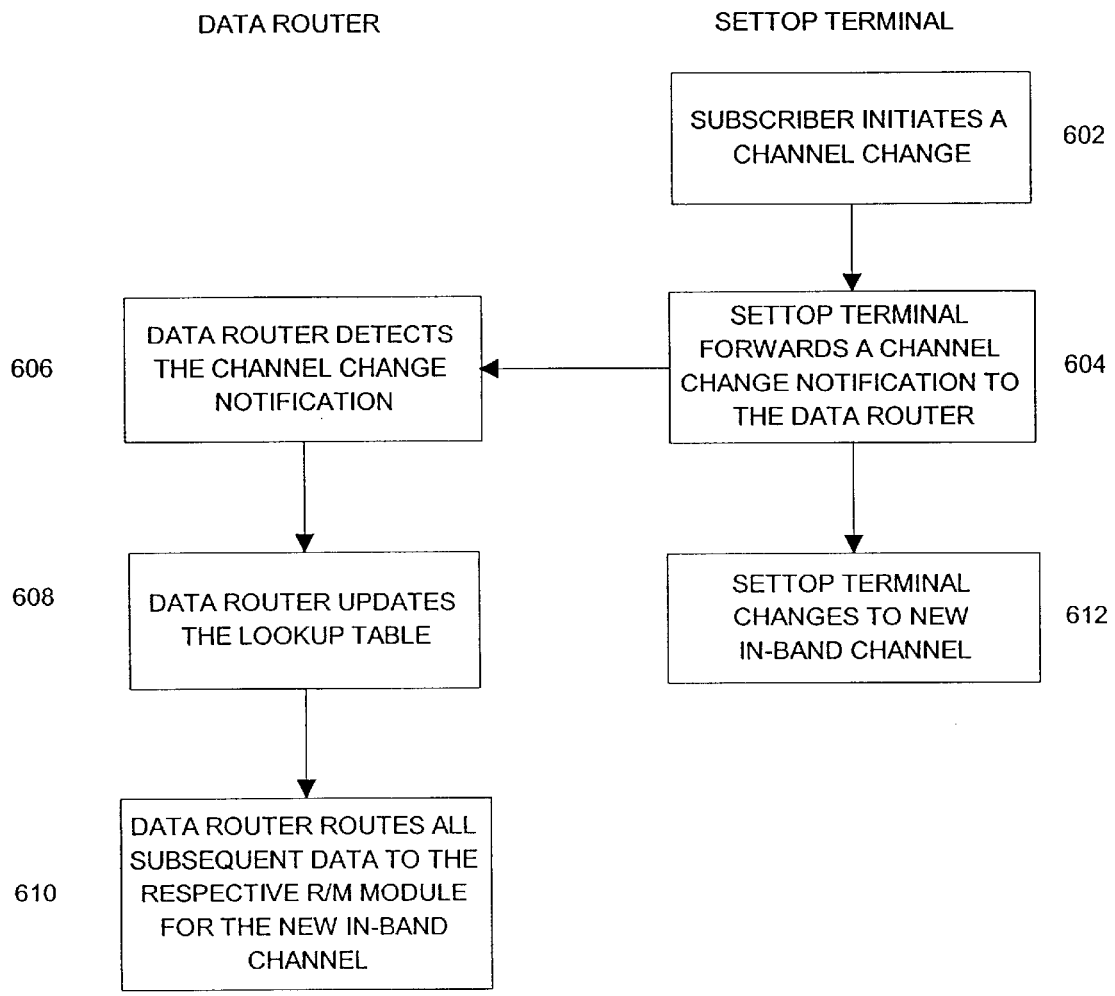
FIG. 7A is a flow diagram illustrating the data re-routing process in accordance with the present invention.

Referring to FIG. 7A, a flow diagram illustrating the data re-routing process in accordance with the present invention is shown. In order to change channels and continue to receive uninterrupted data flow, a subscriber initiates a channel change (step 602) and the settop terminal 12 forwards a channel change notification to the data router 202 (step 604). After a predetermined delay, which may be on the order of milliseconds, the settop terminal 12 changes to the new in-band channel (step 612). This delay permits the settop terminal 12 to receive any data that was sent by the data router 202 prior to the receipt of the channel change notification by the data router 202. The data router 202 detects the channel change notification (step 606), updates the lookup table 291 (step 608) and routes all subsequent data to the respective R/M module 210, 212, 214, 216 (step 610) for the new in-band channel. In order to avoid the loss of data during a channel change, the data may be transmitted simultaneously on the old channel and the new channel for a predetermined duration, or may briefly be stored within memory 290.

Figure 7B:
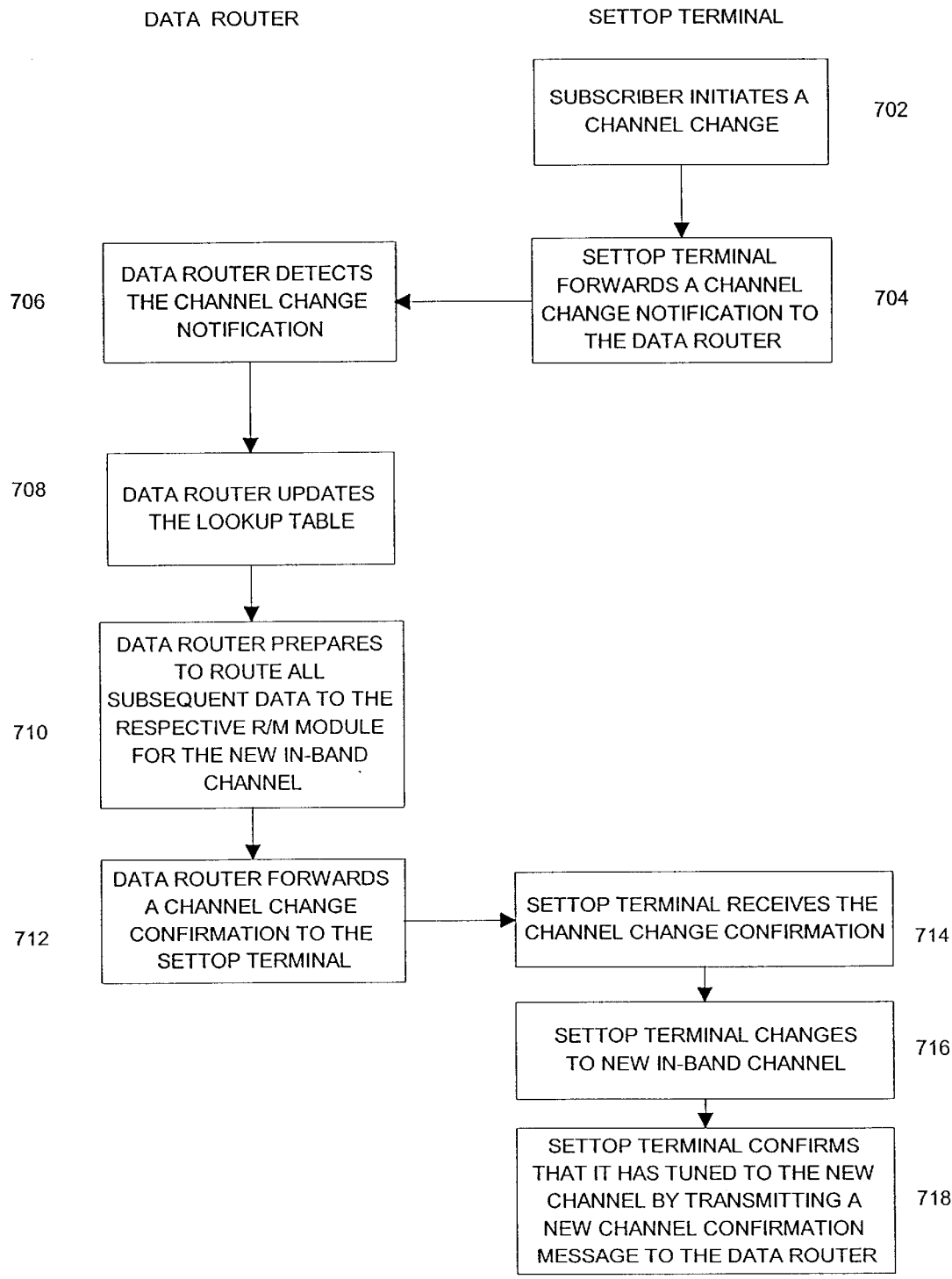
FIG. 7B is an alternative embodiment of the data re-routing process in FIG. 7A.

Referring to FIG. 7B, a flow diagram illustrating an alternative method in accordance with the present invention will be described. In this method, steps 702–708 are the same as corresponding steps 602–608. However, several additional steps are performed in order to confirm that data is being properly routed. Referring to step 710, the data router 202 prepares to send all subsequent data to the respective R/M module 210, 212, 214, 216 for the new in-band channel; however, it does not send the data until steps 712 through 718 have been completed. In essence, the data transmission will be suspended until the new channel has been acquired and a confirmation is sent to the data router 202.

Referring to step 712, the data router 202 forwards a "channel change confirmation" to the settop terminal 12. The settop terminal 12 receives the channel change confirmation (step 714) and changes to the new in-band channel (step 716). The settop terminal 12 then confirms that it has tuned to the new channel by transmitting a "new channel confirmation" message to the data router 202 (step 718). After the data router has received the new channel confirmation message, all subsequent data communications are then routed by the data router 202 to the new respective R/M module 210, 212, 214, 216 associated with the in-band channel.

What is claimed is:

1. A headend for transmitting downstream a CATV signal having a plurality of program channels and for facilitating bidirectional data communications with CATV settop terminals which receive said program channels over a CATV network; said headend comprising:

a processing means associated with each of the program channels for selectively inserting communication data into the associated program channel for downstream transmission; and means for bidirectional communication with settop terminals of upstream and associated downstream communication data including:

means for receiving upstream communication data from said settop terminals including settop terminal identification information and current settop terminal channel selection information; and a data router, responsive to said current settop terminal channel selection information, for directing downstream communication data associated with the upstream communication data from an identified settop terminal to the processing means associated with the channel corresponding to the current settop terminal channel selection information of the identified settop terminal, whereby a user continues to receive the same downstream communication data through the new program channel that the user has selected.

2. The headend of claim 1 further including a storage means for storing said settop terminal identification information and for storing said current settop terminal channel selection information.

3. The headend of claim 1 wherein said data router is coupled to a telecommunications network for transmitting and receiving data communications between said telecommunications network and said CATV network.

4. The headend of claim 1 wherein each processing means further includes means for combining a plurality of program channels to create a program channel multiplex.

5. The headend of claim 4 wherein each of said processing means inserts the downstream data communication into said program channel multiplex to provide a baseband multiplex.

6. The headend of claim 5 wherein each of said processing means further includes means for upconverting said baseband multiplex to a desired carrier frequency for transmission to the settop terminals.

7. A method for providing bidirectional data communications over a CATV network having a headend and at least one settop terminal, the method comprising:

(a) generating a plurality of program channels at said headend with a plurality of program channel processing means;

(b) transmitting said plurality of program channels from said headend to said settop terminal;

(c) receiving said plurality of program channels at said settop terminal;

(d) selecting, at said settop terminal, one of said plurality of program channels;

(e) monitoring said settop terminal from said headend and determining said selected program channel;

(f) routing a downstream data communication to the program channel processing means which generates said selected program channel, whereby a user can change the selected program channel and continue to receive the same downstream data communication through the new program channel that the user has selected; and (g) receiving an upstream data communication from said settop terminal.

* * * * *